UNITED STATES PATENT OFFICE.

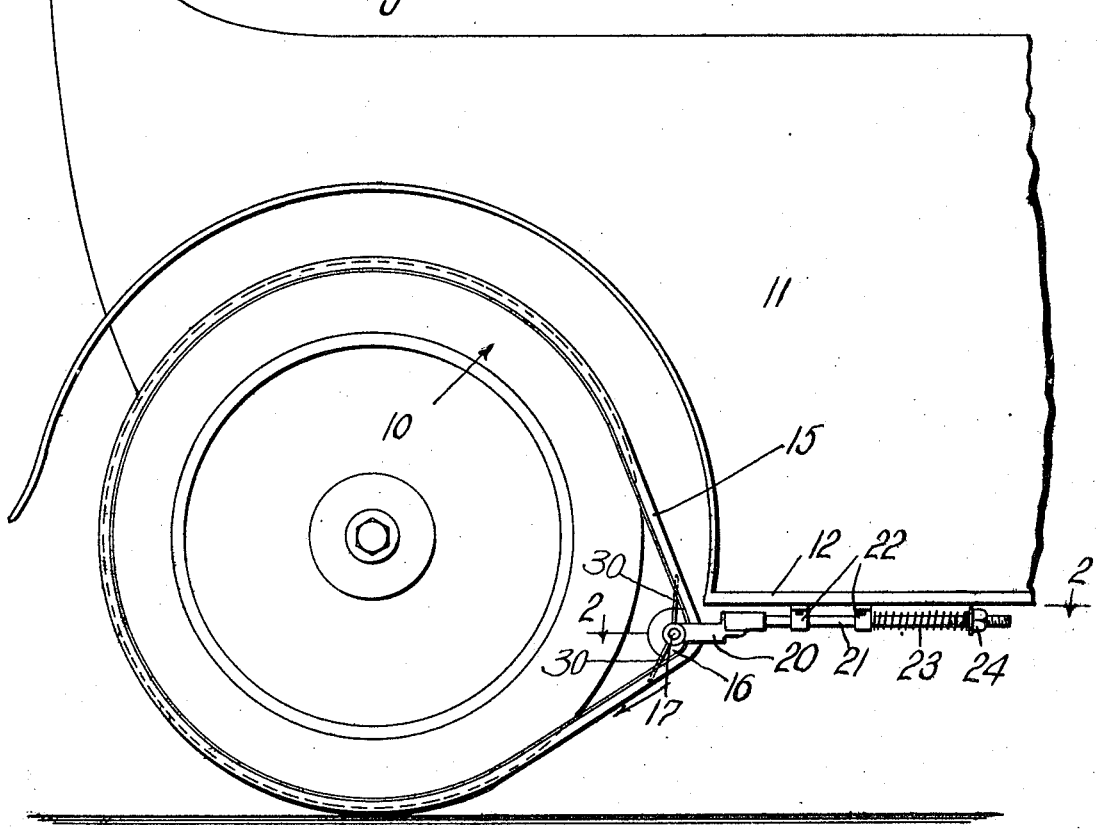
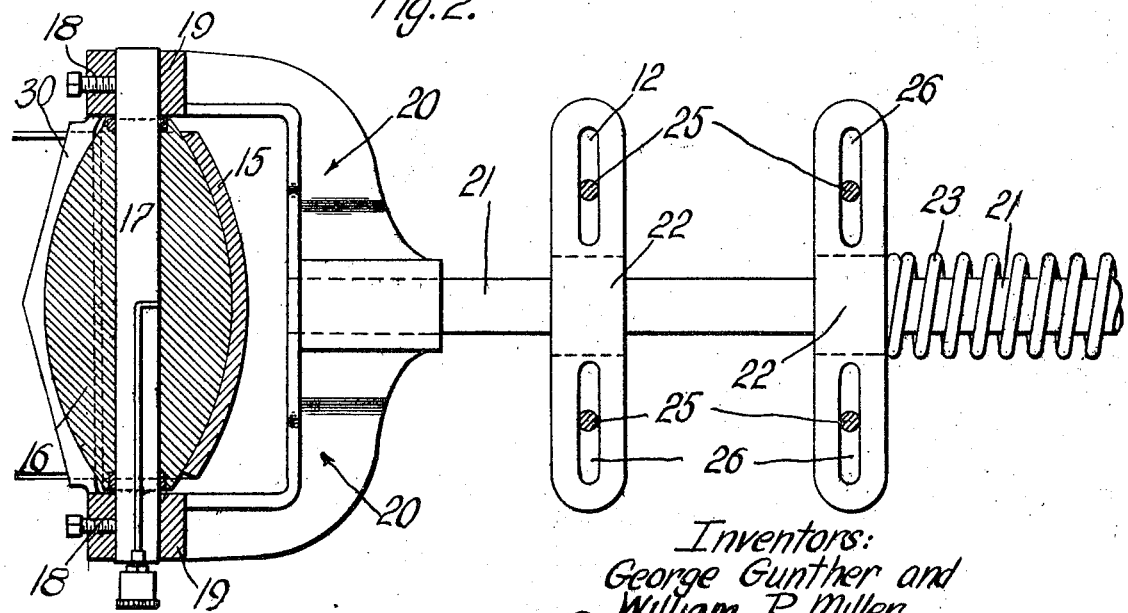

GEORGE GUNTHER AND WILLIAM P. MILLER, OF LOS ANGELES, CALIFORNIA, ASSIGNORS, BY DIRECT AND MESNE ASSIGNMENTS, TO SAID GEORGE GUNTHER.

NON-SKID DEVICE FOR MOTOR-VEHICLES.

1,217,442.

Specification of Letters Patent. Patented Feb. 27, 1917.

Application filed December 27, 1915. Serial No. 68,862.

*To all whom it may concern:*

Be it known that we, GEORGE GUNTHER and WILLIAM P. MILLER, citizens of the United States, residing at Los Angeles, in the county of Los Angeles, State of California, have invented new and useful Improvements in Non-Skid Devices for Motor-Vehicles, of which the following is a specification.

This invention relates to devices for preventing skidding of motor vehicles and also for increasing the tractive power of the same. And it is an object of this invention to provide a simple, reliable and efficient device for accomplishing the purposes set forth.

Our invention relates more particularly to improvements in that class of device which embodies an endless belt of fabric or similar nature passing around the traction or driving wheel and over an idler pulley; and the improvements embodied in our invention are fully described in specific and preferred form in the following specification, reference being had to the accompanying drawings, in which we have illustrated said specific and preferred forms. In the drawings Figure 1 is a side elevation of the traction wheel of an automobile equipped with our invention and Fig. 2 is an enlarged section taken as indicated by line 2—2 on Fig. 1.

In the drawings the numeral 10 designates the traction or rear wheel of an automobile, 11 the body of the automobile and 12 the running board thereof. We mount the stationary parts of our device upon the running board; but it will be understood that they may be mounted upon any convenient part. We utilize a flexible belt 15 of any suitable material, as of fabric or the like; and this fabric belt is somewhat longer than the circumference of the wheel; so that it may pass over the idler pulley 16 in the manner shown in the drawings. This idler pulley 16 is mounted upon a shaft 17, the shaft being preferably stationary and held at its ends by set screws 18 in the ends 19 of a yoke 20. Yoke 20 is mounted and supported upon a shaft 21 which may both revolve and move longitudinally in supporting bearings 22. The shaft 21 extends beyond the bearings; and a compression spring 23 is provided around the shaft, and a nut 24 on the screw threaded end of the shaft provides means for adjusting the tension on spring 23. The spring 23 tends to throw the shaft 21 and the pulley 16 to the right in Fig. 1, tending at all times to hold the belt 15 at a sufficient tension. This tension may be varied by varying the position of nut 24.

The bearings 22 are mounted upon the running board by means of bolts 25 which pass through the slots 26 in the bearings 22; the slots allowing of sufficient adjustment to get the shaft 21 directly in line with the wheel 10; that is, to get the shaft 21 in the central vertical plane of the wheel. It will be noted that the shaft 21 and pulley 16 may, of course, rotate about the axis of the shaft; and the pulley, consequently, automatically accommodates itself to the belt 15 in such a manner as to lie squarely across the belt and in such a manner as to keep the tension distributed evenly to the opposite edges of the belt. This action, together with the normal action of the belt tending to run to the center of the pulley 16, will always keep the belt safely on the wheel 10. The belt after a certain amount of use becomes more or less permanently concaved; so we make the pulley 16 with an exaggeratedly convexed face so as to have the desired action on the belt. Scrapers 30 may be provided to remove any foreign matter, such as mud, from the inside of the belt.

The features which we wish to particularly call attention to are the configuration and mounting of the pulley, the pivotal mounting of the device on the shaft 21, and the spring action tending to keep the belt always at a sufficient degree of tightness. The belt is always kept at uniform tension, the strain is distributed uniformly over it, and it is always held on the driving wheel. The spring 23 not only performs the function of keeping a uniform tension, regardless of stretching of the belt or of relative movement of the wheel 10 and the automobile frame, but it also provides for a certain yielding action should any object lodge between the wheel 10 and the belt.

Having described our invention, we claim:

1. In combination with an automobile and a driving wheel thereof, an endless belt passing peripherally around the wheel, being of greater length than the wheel circumference, an idler pulley inside said belt on an axis transverse to the plane of the automobile wheel; and a mounting for said axis and pulley embodying an axis mounted upon the automobile in the plane of the wheel and at right angles to the axis of the pulley, about which mounting axis the pulley may turn.

2. In combination with an automobile and a driving wheel thereof, an endless belt passing peripherally around the wheel being of greater length than the wheel circumference, a longitudinally movable and rotatable shaft mounted upon the automobile in the central vertical plane of the wheel, and an idler pulley carried by said shaft on an axis transverse to the shaft, said pulley being inside said belt.

3. In combination with an automobile and a driving wheel thereof, an endless belt passing peripherally around the wheel being of greater length than the wheel circumference, a longitudinally movable and rotatable shaft mounted upon the automobile in the central vertical plane of the wheel, a yoke on the end of said shaft nearest the wheel, a transverse shaft carried in said yoke, a pulley on said transverse shaft, over which pulley the belt runs, and a spring on the other end of the first mentioned shaft to resiliently move the shaft and the pulley away from the wheel to hold the belt under uniform tension.

4. In combination with an automobile and a driving wheel thereof, an endless belt passing peripherally around the wheel being of greater length than the wheel circumference, a longitudinally movable and rotatable shaft horizontally mounted upon the automobile in the central vertical plane of the wheel, a yoke carried on the end of the shaft nearest the wheel, a transverse stationary shaft carried in said yoke, a convex faced pulley rotatable on said transverse shaft, over which pulley the belt runs, a compression spring surrounding the other end of the first mentioned shaft, and a nut adjustable on that end of said shaft to adjust the normal compression of said spring.

In witness that we claim the foregoing we have hereunto subscribed our names this 21st day of December, 1915.

GEORGE GUNTHER.
W. P. MILLER.

Witnesses:
JAMES T. BARKELEW,
JAMES R. GOFORTH.